United States Patent Office 2,858,229
Patented Oct. 28, 1958

2,858,229

PREPARATION OF SPINNING SOLUTIONS

Harold K. Hughes, Summit, N. J., assignor to Celanese Corporation of America, New York, N. Y., a corporation of Delaware No Drawing. Application October 6, 1954
Serial No. 460,753

12 Claims. (Cl. 106—198)

This invention relates to the preparation of spinning solutions and relates more particularly to the preparation of spinning solutions of cellulose acetate having a high degree of substitution dissolved in methylene chloride or mixtures of methylene chloride and lower aliphatic alcohols.

In the preparation of spinning solutions of cellulose acetate having a high degree of substitution dissolved in methylene chloride or mixtures of methylene chloride and lower aliphatic alcohols, it is the practice once the cellulose acetate has been dissolved, to filter the said solutions to remove therefrom any undissolved or incompletely dissolved materials. During the filtration and spinning of these solutions, it is necessary to move them from one point to another through conduits by the use of pumps, air pressure, or the like. With solutions having a cellulose acetate concentration of less than about 16% by weight, based on weight of the solution, no special difficulties are encountered in filtering the solution, or in moving it through conduits from one point to another. In addition, no special difficulties are encountered in spinning the said solutions as the result of spinning instability.

However, when the concentration of the cellulose acetate in the spinning solution is increased to above about 18% by weight and especially to above about 20% by weight, the properties of said solution undergo an abrupt change. For example, the viscosity of the spinning solution increases sharply at this level and continues to increase with concentration at a much higher rate than when the concentration is below this level. As a result, much higher pressures are needed to move the said solution through the conduits, filters and spinning heads through which is passes. The filterability of the spinning solution also declines sharply so that the quantity of solution that can be passed through a given filter before it plugs is greatly reduced. Even after the spinning solution is filtered, it is found that there are still present in said solution a large number of small particles visible under suitable conditions as set out more fully below. Repeated filtration of the solution in the presence of filter aids does not materially reduce the number of said particles. Spinning of the concentrated solutions is very difficult, since the spinning instability thereof tends to cause filament breaks, as well as thick spots in the filaments, thus preventing the production of a high quality product.

It is an important object of this invention to provide a process for the preparation of spinning solutions which will be free from the foregoing and other disadvantages.

A further object of this invention is to provide a process for the preparation of concentrated spinning solutions of cellulose acetate having a high degree of substitution dissolved in methylene chloride or mixtures of methylene chloride and lower aliphatic alcohols which will have a low viscosity and good filterability and which will exhibit good spinning stability.

Other objects of this invention will be apparent from the following detailed description and claims.

According to the present invention, there is prepared a dilute solution of cellulose acetate having a high degree of substitution dissolved in methylene chloride or mixtures of methylene chloride and lower aliphatic alcohols, and a portion of the solvent is then removed from the solution to increase its cellulose acetate concentration to the desired value. Concentrated cellulose acetate solutions prepared in this manner have a much lower viscosity as compared with concentrated cellulose acetate solutions prepared in conventional manner by dissolving cellulose acetate directly in the amount of solvent necessary to obtain the desired concentration. As a result, they can be readily pumped through a conduit, or the like, at reduced pressure. These solutions also exhibit a much increased filterability so that a larger volume of said solutions may be forced through a given filter before it plugs. The filtration of the solutions prepared in accordance with this invention proceeds efficiently and removes from the said solutions substantially all foreign particles present therein. The filtered solutions exhibit a good spinning stability and may be converted to filamentary materials, films and the like without difficulty.

According to another aspect of this invention, the properties of the solutions are improved considerably by heating said solutions to an elevated temperature of above about 55° C. The solutions may be heated while they are dilute, or after they have been concentrated. In addition, at least a portion of the heating of the solution may be effected simultaneously with the concentration thereof, by carrying out such concentration procedure at an elevated temperature.

The cellulose acetate to which the process of this invention is applicable is that having an acetyl value of above about 58% by weight, or preferably above about 60% by weight, calculated as acetic acid. Cellulose acetate having a lower acetyl value does not exhibit the special difficulties described above when it is dissolved in a solvent to form a concentrated solution directly. The concentration at which the properties of the solution of the higher acetyl value cellulose acetate change abruptly is at about 19% by weight, based on the weight of the solution, so that in carrying out this invention, the cellulose acetate solution should be formed at a lower concentration and solvent removed until the concentration is above this value. The best results are obtained and the advantages of this invention are realized to the fullest extent when this cellulose acetate solution is formed at a concentration of below about 18% by weight and sufficient solvent is removed to increase the concentration of the cellulose acetate in the solution to above about 20% by weight. The dilute cellulose acetate solution may be formed by dissolving the cellulose acetate in the amount of solvent needed to give directly a solution of the desired low concentration. Alternatively, the cellulose acetate may be dissolved to give a solution of higher concentration and additional solvent may be added to the solution to reduce its concentration to the desired value.

The solvent employed in preparing the solution is either methylene chloride or a mixture of methylene chloride and a lower aliphatic alcohol, such as methanol, ethanol, normal propanol, isopropanol, or the butanols. The proportion of alcohol in the solvent may range up to about 25% by weight, based on the total weight of the solvent.

The solution of the cellulose acetate in the solvent may be readily carried out by adding the required amount of cellulose acetate to the solvent, either on a batch basis or, if desired in a continuous manner. To assist in achieving a homogeneous solution, stirring means should be provided to achieve a uniform and thorough contact of the cellulose acetate with the solvent, and to break up and disperse any gels, lumps or particles of undissolved cellulose acetate. After the solution has been prepared, it may be filtered to remove therefrom undissolved particles. However, it is also possible, and in some cases preferable, to filter the solution also after its concentration has been increased to the final value. Filtration at the final concentration offers the advantage that any "skins" or dried bits of cellulose that may be formed during the concentration procedure are removed from the solution and will not interfere with the spinning operation. Filtration of the concentrated solution prepared in accordance with this invention offers no special difficulties owing to the relatively low viscosity and good filterability of the said solution.

To effect the concentration of the dilute cellulose acetate solution, the said solution in bulk may be heated to an elevated temperature while permitting the escape of the solvent vapors. During such heating, the solution should be stirred to prevent the formation of skins of cellulose acetate, which skins will not readily dissolve in the solution. The dilute solution may also be concentrated by extruding the same in the form of filaments, ribbon, film or the like into a chamber and regulating the temperature, pressure, rate of flow, and other conditions in said chamber so that the desired amount of solvent is removed from the solution. The concentrated solution collects in the bottom of said chamber and is withdrawn therefrom to be filtered and spun.

The cellulose acetate solution is heated to a temperature above about 55° C., or between about 55 and 120° C., or preferably between about 75 and 100° C. for a period of at least about 2 minutes or between about 2 and 400 minutes, or preferably between about 5 and 150 minutes, with longer periods being desirable at lower temperatures. Such heating may be carried out on the dilute solution or on the concentrated solution, or may, if desired, be carried out simultaneously with the concentration step. The heating of the solution to these temperatures greatly improves the properties thereof with respect to its filterability and also with respect to its spinning stability. The solution may be prepared initially at a lower temperature and then heated to the temperatures specified, or the solution may be prepared initially at the higher temperatures.

The following examples are given to illustrate this invention further.

*Example I*

A cellulose acetate having an acetyl value of 61.5% by weight is dissolved with stirring in a mixture of 90% by weight of methylene chloride and 10% by weight of methanol to give a solution having a concentration of 14.9% by weight. The solution is then heated, with mixing, while permitting solvent vapors to escape, until its cellulose acetate concentration reaches 21.0% by weight. The viscosity of the final solution is 1300 poises.

When the same cellulose acetate is dissolved in an identical solvent mixture to give directly a solution having a concentration of 21.0% by weight, the viscosity of the solution is 2320 poises. On filtering the solutions through a given filter, the filter will pass approximately 4 times as much of the former solution before its plugs as compared with the latter. After filtration, the solution prepared directly at final concentration when examined under a microscope with crossed polarizing elements shows a particle count of 90 per cubic millimeter. The solution prepared at a low concentration and then concentrated shows a particle count of zero under the same conditions.

*Example II*

A cellulose acetate having an acetyl value of 61.4% by weight is dissolved with stirring in a mixture of 90% by weight of methylene chloride and 10% by weight of methanol to give a solution having a concentration of 18% by weight. The solution is then heated, with mixing, while permitting solvent vapors to escape, until its cellulose acetate concentration reaches 22.0% by weight. The concentrated solution is filtered and spun into filamentary material.

The same cellulose acetate is dissolved in an identical solvent mixture to form directly a solution having a cellulose acetate concentration of 22.3% by weight, which solution is filtered and spun into filamentary materials. During spinning, breaks occur 9 times as frequently in the case of the latter solution as in the case of the former showing that the spinning stability of the two solutions differs appreciably.

*Example III*

A cellulose acetate having an acetyl value of 61.6% by weight is dissolved with stirring in a mixture of 90% by weight of methylene chloride and 10% by weight of methanol to give a solution having a concentration of 17.8% by weight. The solution is then heated with mixing to a temperature of 69° C. for a period of 345 minutes. Then, the solution is heated with mixing, while permitting solvent vapors to escape, until its cellulose acetate concentration reaches 22.4% by weight.

On filtering the dilute solution that has been heated and also the concentrated solution through a given filter, it is found that the said filter will pass about twice as much of the said solutions before it plugs as compared with the original dilute solution. When the same cellulose acetate is dissolved initially in the same solvent mixture to give a solution having a cellulose acetate concentration of 21.7% by weight, it is found that the filter will pass only about one-sixth as much of said solution as compared with the solution that has been prepared at a lower concentration and then concentrated.

It is to be understood that the foregoing detailed description is given merely by way of illustration and that many variations may be made therein without departing from the spirit of my invention.

Having described my invention, what I desire to secure by Letters Patent is:

1. Process for the preparation of concentrated solutions of cellulose acetate having an acetyl value of above about 58% by weight dissolved in a solvent, which comprises forming a solution having a concentration of less than about 19% by weight of the cellulose acetate in a solvent of the class consisting of methylene chloride and mixtures of methylene chloride and lower aliphatic alcohols, and removing solvent from said solution until the concentration of the cellulose acetate in said solution is at the desired value above about 20% by weight to form a concentrated cellulose acetate solution of improved filterability and spinning stability, as compared with a solution of the same high concentration prepared by direct dissolving at said high concentration.

2. Process for the preparation of concentrated solutions of cellulose acetate having an acetyl value of above about 58% by weight dissolved in a solvent, which comprises forming a solution having a concentration of less than about 18% by weight of the cellulose acetate in a solvent, of the class consisting of methylene chloride and mixtures of methylene chloride and lower aliphatic alcohols, and removing solvent from said solution until the concentration of the cellulose acetate in said solution is above about 20% by weight to form a concentrated cellulose acetate solution of improved filterability and spinning stability, as compared with a solution of the same high concentration prepared by direct dissolving at said high concentration.

3. Process for the preparation of concentrated solutions of cellulose acetate having an acetyl value of above about 58% by weight dissolved in a solvent, which comprises forming a solution having a concentration of less than about 19% by weight of the cellulose acetate in a solvent of the class consisting of methylene chloride and mixtures of methylene chloride and lower aliphatic alcohols, and removing solvent from said solution while stirring the same until the concentration of the cellulose acetate in said solution is at the desired value above about 20% by weight to form a concentrated cellulose acetate solution of improved filterability and spinning stability, as compared with a solution of the same high concentration prepared by direct dissolving at said high concentration.

4. Process for the preparation of concentrated solutions of cellulose acetate having an acetyl value of above about 58% by weight dissolved in a solvent, which comprises forming a solution having a concentration of less than about 19% by weight of the cellulose acetate in a solvent of the class consisting of methylene chloride and mixtures of methylene chloride and lower aliphatic alcohols, and removing solvent from said solution by heating the same with stirring until the concentration of the cellulose acetate in said solution is at the desired value above about 20% by weight to form a concentrated cellulose acetate solution of improved filterability and spinning stability, as compared with a solution of the same high concentration prepared by direct dissolving at said high concentration.

5. Process for the preparation of concentrated solutions of cellulose acetate having an acetyl value of above about 58% by weight dissolved in a solvent, which comprises forming a dilute solution of the cellulose acetate in a solvent of the class consisting of methylene chloride and mixtures of methylene chloride and lower aliphatic alcohols, removing solvent from said solution until the concentration of the cellulose acetate in said solution is at the desired value above about 20% by weight, to form a concentrated cellulose acetate solution of improved filterability and spinning stability, as compared with a solution of the same high concentration prepared by direct dissolving at said high concentration and filtering the concentrated solution.

6. Process for the preparation of concentrated solutions of cellulose acetate having an acetyl value of above about 58% by weight dissolved in a solvent, which comprises forming a solution having a concentration of less than about 19% by weight of the cellulose acetate in a solvent of the class consisting of methylene chloride and mixtures of methylene chloride and lower aliphatic alcohols, removing solvent from said solution until the concentration of the cellulose acetate in said solution is at the desired value above about 20% by weight, to form a concentrated cellulose acetate solution of improved filterability and spinning stability, as compared with a solution of the same high concentration prepared by direct dissolving at said high concentration and filtering the concentrated solution.

7. Process for the preparation of concentrated solutions of cellulose acetate having an acetyl value of above about 58% by weight dissolved in a solvent, which comprises forming a solution having a concentration of less than about 18% by weight of the cellulose acetate in a solvent of the class consisting of methylene chloride and mixtures of methylene chloride and lower aliphatic alcohols, removing solvent from said solution until the concentration of the cellulose acetate in said solution is above about 20% by weight, to form a concentrated cellulose acetate solution of improved filterability and spinning stability, as compared with a solution of the same high concentration prepared by direct dissolving at said high concentration and filtering the concentrated solution.

8. Process for the preparation of concentrated solutions of cellulose acetate having an acetyl value of above about 58% by weight dissolved in a solvent, which comprises forming a solution having a concentration of less than about 18% by weight of the cellulose acetate in a solvent of the class consisting of methylene chloride and mixtures of methylene chloride and lower aliphatic alcohols, removing solvent from said solution by heating the same with stirring until the concentration of the cellulose acetate in said solution is above about 20% by weight, to form a concentrated cellulose acetate solution of improved filterability and spinning stability, as compared with a solution of the same high concentration prepared by direct dissolving at said high concentration and filtering the concentrated solution.

9. Process for the preparation of concentrated solutions of cellulose acetate having an acetyl value of above about 58% by weight dissolved in a solvent, which comprises forming a dilute solution of the cellulose acetate in a solvent of the class consisting of methylene chloride and mixtures of methylene chloride and lower aliphatic alcohols, removing solvent from said solution until the concentration of the cellulose acetate in said solution is at the desired value above about 20% by weight, and heating the solution to a temperature of above about 55° C. to form a concentrated cellulose acetate solution of improved filterability and spinning stability, as compared with a solution of the same high concentration prepared by direct dissolving at said high concentration.

10. Process for the preparation of concentrated solutions of cellulose acetate having an acetyl value of above about 58% by weight dissolved in a solvent, which comprises forming a solution having a concentration of less than about 19% by weight of the cellulose acetate in a solvent of the class consisting of methylene chloride and mixtures of methylene chloride and lower aliphatic alcohols, removing solvent from said solution until the concentration of the cellulose acetate in said solution is at the desired value above about 20% by weight, and heating the solution to a temperature of between about 55 and 120° C. for a period of between about 2 and 400 minutes to form a concentrated cellulose acetate solution of improved filterability and spinning stability, as compared with a solution of the same high concentration prepared by direct dissolving at said high concentration.

11. Process for the preparation of concentrated solutions of cellulose acetate having an acetyl value of above about 58% by weight dissolved in a solvent which comprises forming a solution having a concentration of less than about 18% by weight of the cellulose acetate in a solvent, of the class consisting of methylene chloride and mixtures of methylene chloride and lower aliphatic alcohols, removing solvent from said solution until the concentration of the cellulose acetate in said solution is above about 20% by weight, and heating the solution to a temperature of between about 75 and 100° C. for a period of between about 5 and 150 minutes, 12. Process as set forth in claim 1 in which said cellulose acetate has an acetyl value of above about 60% and in which the evaporation is carried out until the concentration of cellulose acetate in the solution is 20 to 25% by weight, and in which the resulting solution is then filtered.

References Cited in the file of this patent

UNITED STATES PATENTS

| | | |
|---|---|---|
| 1,762,937 | Staude | June 10, 1930 |
| 1,831,795 | Branchen et al. | Nov. 10, 1931 |
| 2,045,161 | Muller et al. | June 23, 1936 |
| 2,319,055 | Fordyce et al. | May 11, 1943 |
| 2,492,977 | Fordyce et al. | Jan. 3, 1950 |
| 2,697,251 | Bauer | Dec. 21, 1954 |

FOREIGN PATENTS

| | | |
|---|---|---|
| 285,829 | Great Britain | Dec. 6, 1928 |
| 323,031 | Great Britain | Dec. 13, 1929 |